United States Patent
Egner et al.

(10) Patent No.: US 10,837,116 B2
(45) Date of Patent: Nov. 17, 2020

(54) ELECTROLYTIC REACTOR

(71) Applicant: Fraunhofer-Gesellschaft zur Foerderung der angewandten Forschung e.V., Munich (DE)

(72) Inventors: Siegfried Egner, Adelsheim (DE); Iosif Mariakakis, Stuttgart (DE); Uwe Claussnitzer, Stuttgart (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 10 days.

(21) Appl. No.: 15/823,098

(22) Filed: Nov. 27, 2017

(65) Prior Publication Data
US 2019/0161871 A1   May 30, 2019

(51) Int. Cl.
| | | |
|---|---|---|
| *C25B 11/02* | (2006.01) | |
| *C02F 1/461* | (2006.01) | |
| *C25B 1/18* | (2006.01) | |
| *C25B 9/12* | (2006.01) | |
| *C25B 15/04* | (2006.01) | |
| *C25B 11/04* | (2006.01) | |
| *C02F 101/10* | (2006.01) | |

(52) U.S. Cl.
CPC .......... *C25B 11/02* (2013.01); *C02F 1/46109* (2013.01); *C25B 1/18* (2013.01); *C25B 9/12* (2013.01); *C25B 11/0415* (2013.01); *C25B 15/04* (2013.01); *C02F 2001/46123* (2013.01); *C02F 2001/46133* (2013.01); *C02F 2001/46152* (2013.01); *C02F 2101/105* (2013.01)

(58) Field of Classification Search
CPC ....... C25B 11/02; C25B 11/0415; C25B 9/12; C25B 1/18; C25B 15/04; C02F 1/46109; C02F 2001/46123; C02F 2001/46152; C02F 2001/46133; C02F 2101/105
See application file for complete search history.

(56) References Cited

U.S. PATENT DOCUMENTS

| | | | |
|---|---|---|---|
| 1,879,842 A | 9/1932 | Conradty | |
| 4,045,320 A * | 8/1977 | Klingenberg | C23F 13/02 204/196.18 |

(Continued)

FOREIGN PATENT DOCUMENTS

| | | |
|---|---|---|
| DE | 102005034138 A1 | 1/2007 |
| DE | 202008003027 U1 | 6/2008 |
| EP | 02383230 A1 | 11/2011 |

*Primary Examiner* — Louis J Rufo
(74) *Attorney, Agent, or Firm* — Bond Schoeneck & King, PLLC; George McGuire

(57) ABSTRACT

The invention concerns an electrolytic reactor, in particular for separating phosphate from phosphate-containing liquids and recovering phosphate salts, comprising a housing, an inlet and an outlet for the liquid and two electrodes of different polarity, which enclose a reactor chamber between them, whereby at least one of the two electrodes is a sacrificial electrode and consists of a magnesium-containing material, whereby the sacrificial electrode is constructed of trapezoid bars which have a first and a second upper surface, whereby the first upper surface is smaller than the second upper surface, and whereby four lateral surfaces connect the first upper surface with the second upper surface.

7 Claims, 7 Drawing Sheets

(56) References Cited

U.S. PATENT DOCUMENTS

| | | | |
|---|---|---|---|
| 4,055,474 A * | 10/1977 | Sivilotti | C25C 7/005 |
| | | | 205/404 |
| 4,243,733 A * | 1/1981 | Brennan | B29C 53/063 |
| | | | 429/104 |
| 4,686,018 A * | 8/1987 | Chaussard | C25B 3/00 |
| | | | 204/260 |
| 2011/0062018 A1 | 3/2011 | Blum | |
| 2014/0076804 A1 * | 3/2014 | Kruk | C02F 1/463 |
| | | | 210/631 |
| 2015/0225262 A1 | 8/2015 | Wiemers | |

* cited by examiner

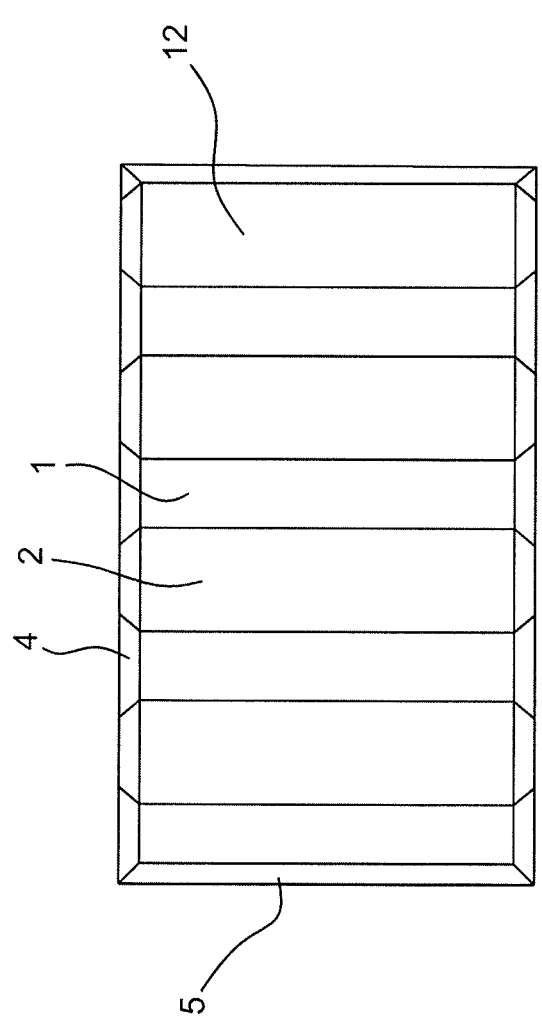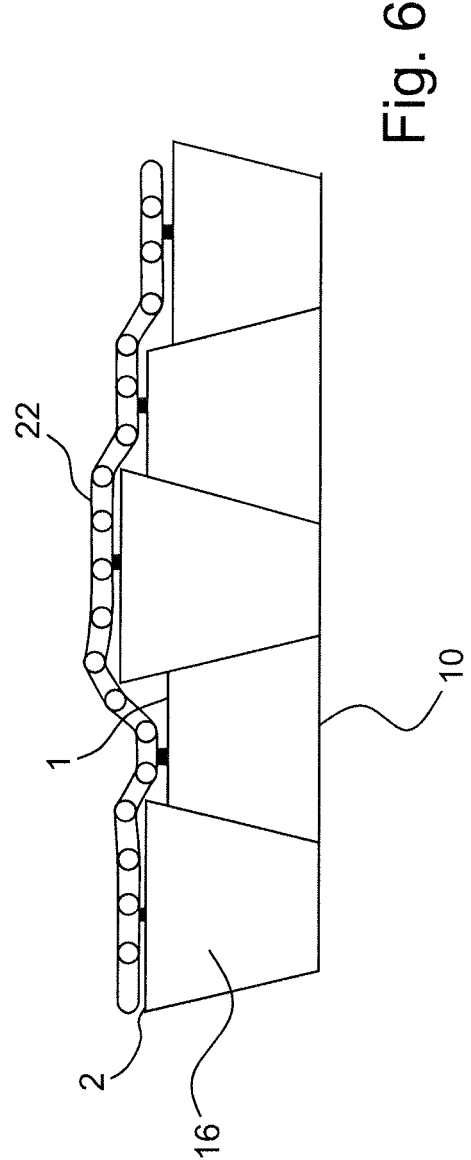

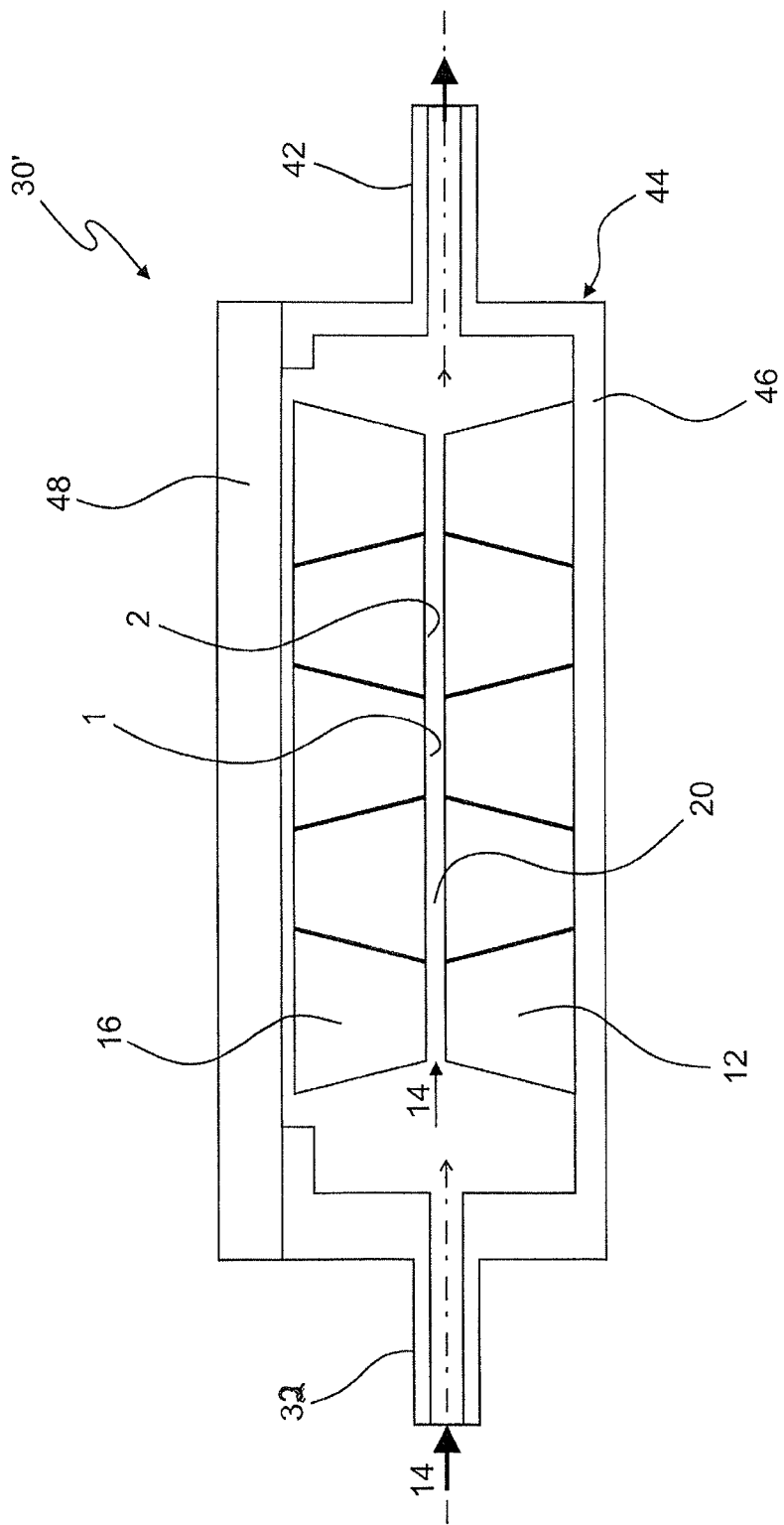

ELECTROLYTIC REACTOR

BACKGROUND

In process engineering, electrolytic reactors comprising one cathode and one anode are often used. When the reactor is operating, an electrical voltage is applied between the cathode and the anode such that the anode is consumed (sacrificial anode). For example, DE 10 2010 050 691 B3 and DE 10 2010 050 692 B3 describe a method and a reactor for recovering phosphate salts from a liquid whereby the sacrificial electrodes consist of a magnesium-containing material.

In particular, in the state of the art, many documents already disclose how in the case of sacrificial anodes, the cathode is designed to be movable such that the distance between the cathode and the anode can be kept constant. The object of the present invention is to provide an electrolytic reactor comprising two electrodes of different polarity whereby at least one of the two electrodes is a sacrificial electrode consisting of a magnesium-containing material and whereby the electrodes can be provided as cost-effectively as possible.

SUMMARY OF THE INVENTION

According to the invention, this object is achieved with an electrolytic reactor, in particular for separating phosphate from phosphate-containing liquids and recovering phosphate salts, comprising a housing, an inlet and an outlet for the liquid, and two electrodes of different polarity which enclose a reaction chamber between them, whereby at least one of the two electrodes is a sacrificial electrode made of a magnesium-containing material whereby the sacrificial electrode is constructed of trapezoidal bars having a first and a second upper surface where the first upper surface is smaller than the second upper surface, and where four lateral surfaces are provided which connect the first upper surface with the second upper surface.

Preferably, the sacrificial electrode consists of crude magnesium. In the manufacturing process, magnesium is cast in the form of trapezoidal bars as semi-finished products. By using the bars without another processing step, the cost of the magnesium that is to be used in a reactor can be kept relatively low. Alternatively the bars are called ingots. The electrolytic recovery of phosphorus as a crystallized magnesium ammonium phosphate (MAP or Struvite), with magnesium deficiency in the initial substrate, proceeds according to the following formula:

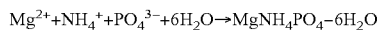

$$Mg^{2+} + NH_4^+ + PO_4^{3-} + 6H_2O \rightarrow MgNH_4PO_4 \cdot 6H_2O$$

by liberating magnesium ions on the surface of a sacrificial anode of magnesium. Then the crystallized MAP can be removed from the liquid.

The bars are designed such that at least two of the edge lengths of the first upper surface are parallel, but that preferably all four edge lengths are shorter than those of the second upper surface. Hereafter, the latter will be called all-round trapezoidal bars.

It is especially preferred when the bars—to form a continuous surface—are arranged with the first and second upper surfaces alternately facing the reaction chamber and complementing each other in form. The bars are arranged such that they abut each other with their preferably long lateral surfaces in case of rectangular basic shapes such that the one slanted lateral surface extends from the larger to the smaller surface of a second bar and is complemented such that an upper surface is plane when the electrode is seen in top view.

A plane or substantially plane surface is understood as such that a constant continuous or homogeneous surface is formed as seen in top view, and only smaller than 5%, in particular smaller than 3% of the entire electrode surface does not participate in the surface lying in one plane. Due to the diagonal lateral surfaces between the first and second upper surface, the plane surface of the electrode is somewhat smaller than the surface actually filled with the electrodes. This effect in the edge region, which with bars arranged in two rows can also occur between the rows, does not compromise the electrodes and is neglected in the definition of the plane surface if the portion is smaller than 5% and preferably smaller than 2%. The plane surface is to be maintained throughout the entire consumption of the electrode.

A particularly preferred arrangement can be that the bars have a longitudinal direction and that the longitudinal direction is transverse to the flow direction of the reactor, i.e. in terms of their first and second upper surfaces, the bars have a longer lateral edge and a shorter lateral edge, whereby the direction of the longer lateral edge is transverse to the flow direction of the reactor.

Alternatively, designs are also conceivable where the bars are arranged lengthwise in flow direction of the reactor. In principle it can be provided that the bars abut each other with their lateral surfaces which run in longitudinal direction. However, it is also feasible in principle that alternatively or additionally other bars are connected to the shorter lateral surface.

It is particularly preferred when both electrodes are sacrificial electrodes and both are made of a magnesium-containing material, and it is also preferred when both electrodes consist of trapezoidal magnesium-containing bars. Preferably, the bars can be made of crude magnesium. In that way, it can be achieved that by reversing the polarity, the upper as well as the lower electrode can be consumed since they are alternating between serving as anode and as cathode. Furthermore, by reversing the polarity, it can be achieved that there are no deposits forming on the electrode that serves as a cathode; otherwise such deposits must be removed by means of repeated rinsing. When the polarity is reversed from one electrode to the other, only minor deposits may result which are removed again when the electrode is subsequently used as an anode. This makes it possible to conduct a particularly good and continuous process.

In addition, it is particularly advantageous when an electrode can be moved relative to the other electrode. In that way, regardless of the consumption of the electrodes, the distance between the two electrodes can always remain constant. Therefore the electrical field between the electrodes is always even, and optimal conversion rates are achieved in the reactor while energy consumption is low.

It is generally advantageous when one of the electrodes is connected with a housing base and another electrode with an upper housing part. It is particularly advantageous and especially easy to accomplish when the electrode for the upper housing part is moved relative to the other electrode. If that electrode is not designed to be a sacrificial electrode, it can be made of stainless steel or other non-corrosive electrically conductive material. It is of special importance for the process that a constant distance is maintained between the surfaces of the electrodes regardless of any consumption. These surfaces border a channel through which the liquid to be treated is flowing. When the geometry of the channel and the electrical field between the electrodes (anode and cathode) are constant, very defined and very good conversion rates are achieved with a minimum of energy consumption.

In an advantageous embodiment of the invention, the desired distance can be achieved when between the surfaces of the electrodes bordering the channel at least one electrically non-conductive spacer is provided that can be made of plastic or other material. To prevent the tilting of the electrodes against each other, it is usually an advantage to provide at least two spacers. The spacers are dimensioned such that the distance between the electrodes is maintained regardless of whether the electrodes are being consumed. The channel between the electrodes is regarded as a reaction chamber.

The distance can be held constant by means of gravity, by one or more springs, or by one or more actuators. When gravity is used, for example to track the upper electrode to the lower electrode—when the reactor is being operated—as a rule the electrode provided in vertical direction above the other electrode is tracked to the lower electrode. If the described spacer is provided between the electrodes, the distance between the surfaces bordering the reaction chamber is always held constant in a very simple and reliable way regardless of whether the electrodes are being consumed or not.

When actuators are used to track one electrode to the other, the spacing between the electrodes can be regulated or controlled with sensors which detect the consumption, i.e. the remaining thickness of the electrodes as part of a control circuit. All commercially available types of sensors can be used for this.

In principle, although not preferred, it is also possible with this invention to move both electrodes to keep the spacing between the electrodes constant.

It is easiest to keep the reaction room or the channel between the bordering upper surfaces of the electrodes constant, when the surfaces of both electrodes bordering the reaction chamber are plane.

Furthermore it is especially preferred when the surfaces of the electrodes which border the channel are rectangular, which means that essentially a cubic shape is provided for the two electrodes in spite of their thickness, whereby it applies what was said above, that only the edge region of the electrodes should deviate from the cubic form, where a deviation of 5%, but in particular of 2% related to the total surface of the bars is regarded as a cubic form.

It is also possible to provide the inventive reactor with means to detect the position of the electrodes, to gauge the reactor operation, the process and the consumption of the at least one sacrificial electrode. For example, these means to detect the position of at least one electrode can consist of a position sensor of any design. Preferably this position sensor is fastened to the electrode that is movably attached to the housing of the reactor if such an electrode is provided. This is how the consumption of the sacrificial electrodes can be monitored in a simple and very reliable manner.

Finally, means are also provided to detect the electrical current flowing between the electrodes and/or the voltage applied between the electrodes. With this, the process taking place in the reactor can be monitored simply and reliably. Potential malfunctions of the process can lead to a change in the electrical current and/or voltage and can thus be simply detected.

It is particularly advantageous when the reaction chamber has a rectangular cross-section in flow direction and has a constant flow cross-section throughout the entire reaction chamber. This is how a particularly even and good reaction process can be achieved, and the conversion can be optimal.

The at least one electrode, namely the sacrificial electrode, consists of a magnesium-containing material. It is especially advantageous when pure magnesium is used for this. It is particularly preferred when both electrodes are designed as sacrificial electrodes made of magnesium-containing material, especially of pure magnesium.

To allow for a particularly simple way of contact for the electrodes, especially when a movable electrode is planned, it can be provided that the electrode is contacted via a flexible contact strip or a flexible contact chain that is in contact with every one of the bars. That way it can be assured that each of the electrodes can be securely contacted. In particular in case of bar-shaped elements, problems may occur since due to the casting process, the bars may show certain differences in height.

As a rule, the bars, in particular magnesium bars, are not cast in large-scale processes but manually or in small quantities, which means that fill fluctuations can be expected which may have the result that not all bars in the electrode may come in contact with a contact plate in the same way. Also, a certain shrinkage takes place during cooling, which means that the upper surfaces of the bars may not be completely plane but may show some retraction.

Since an oxide layer may form on the bars, it can happen that the potentials of an electrode do not equalize between the bars. It is therefore advantageous when contacting is the same via all the bars. By means of a contact chain or a flexible contact strip it can be achieved that the contact strip or the chain comes to lie on all the bars and that therefore all the bars are electrically contacted.

BRIEF DESCRIPTION OF THE DRAWINGS

Other advantages and characteristics of the invention are shown in the following drawings where FIG. 5 shows an electrode in top view, and FIG. 6 shows a sectional view through the bars of the upper electrode with intended contacting.

DETAILED DESCRIPTION

Figure 1B:
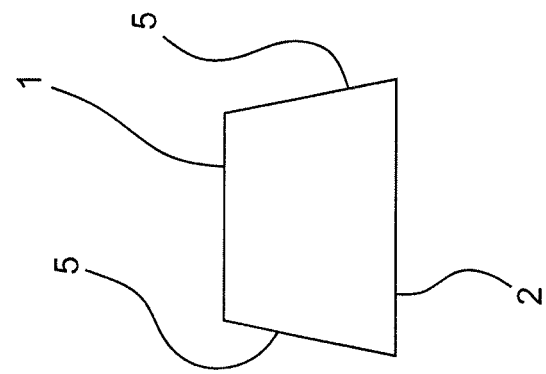
FIG. 1 shows a longitudinal section through a magnesium bar in view (a) and a cross-section thereof in view (b)
Figure 1A:
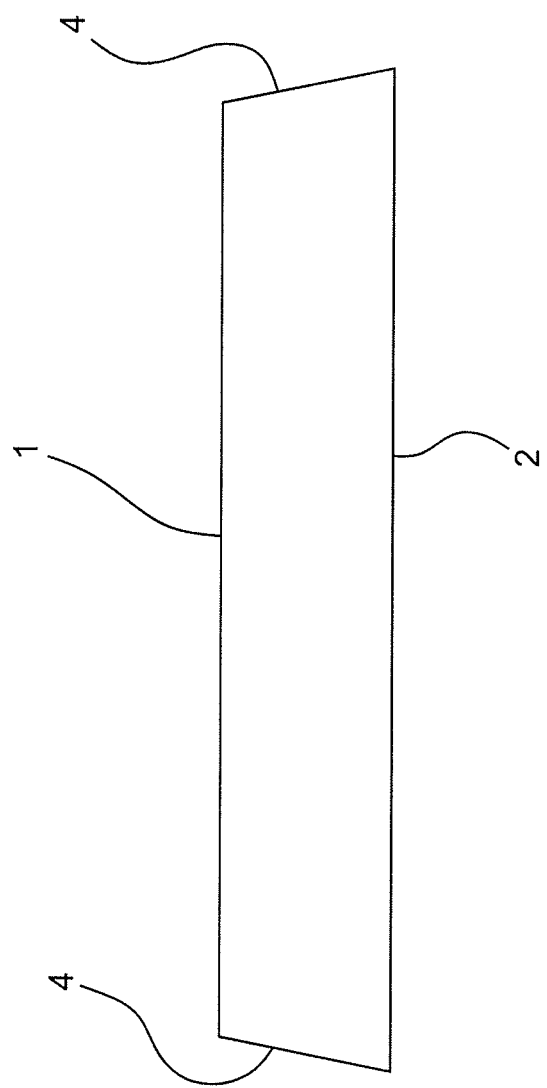

FIG. 1 shows a longitudinal section through a commercially available magnesium bar with a smaller upper side 1 and a larger upper side 2, whereby the two lateral surfaces 4 and 5 between the upper surfaces 1 and 2 are shown in Fig. (a) and (b). The bar is all-round trapezoid.

Figure 2:
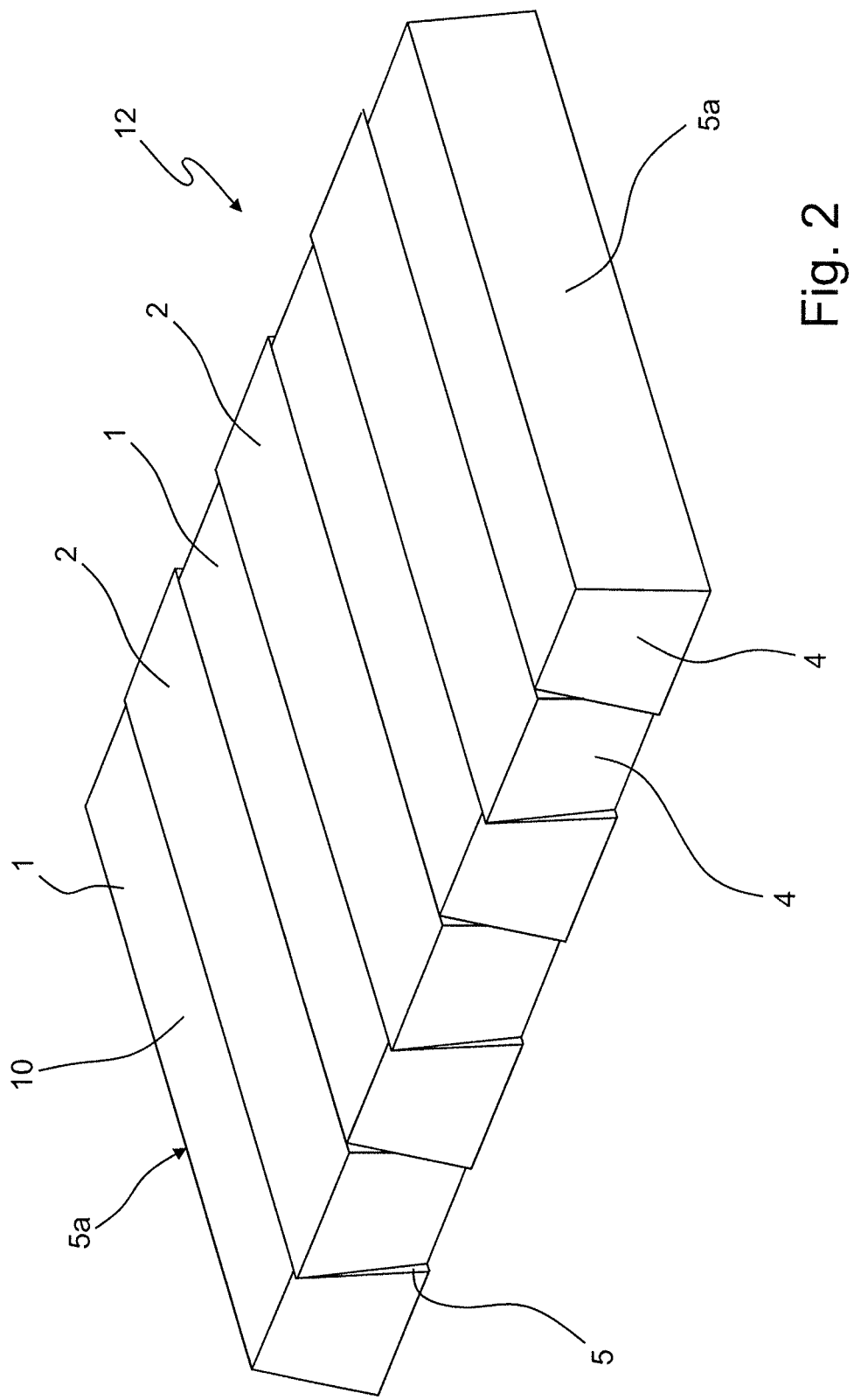
FIG. 2 shows a first electrode design.
Figure 3:
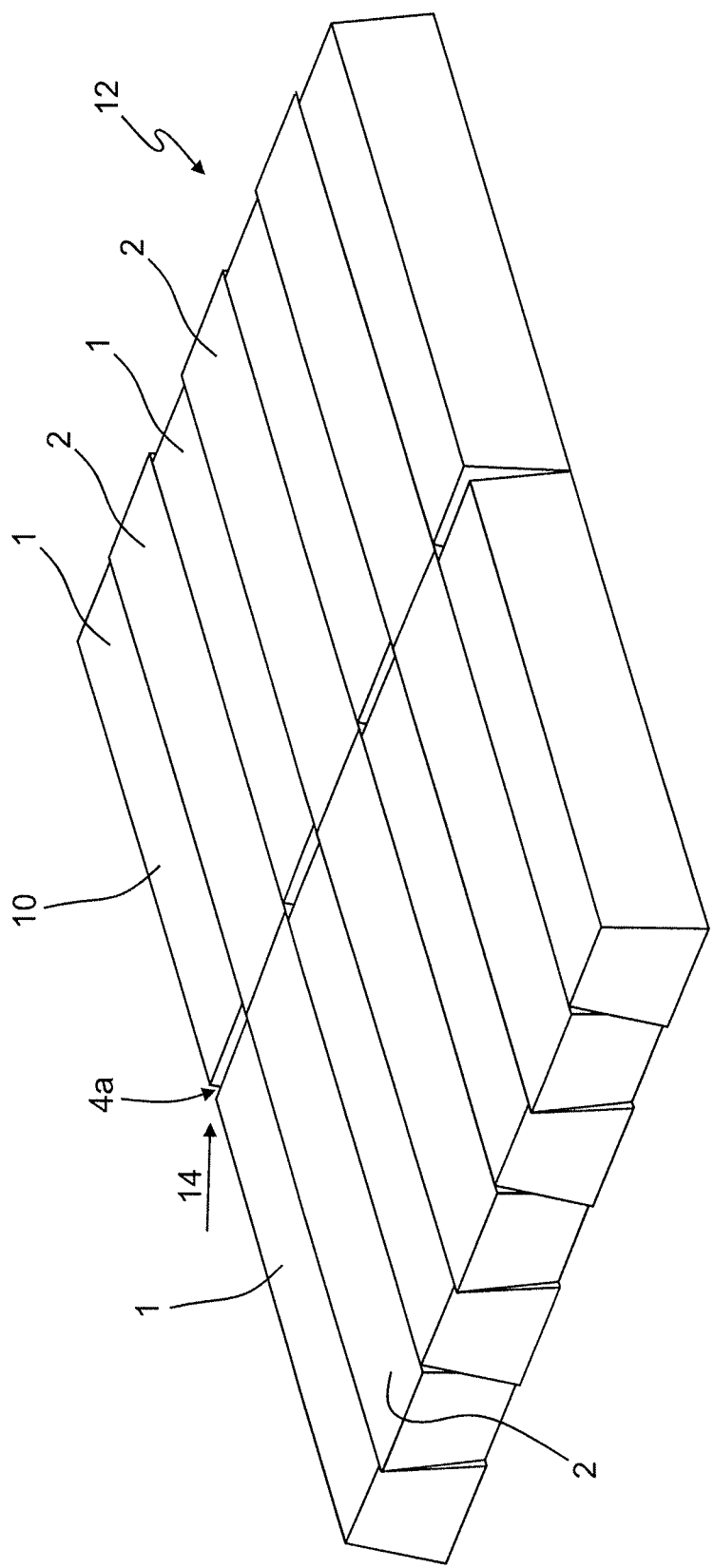
FIG. 3 shows an alternative electrode design.

FIG. 2 illustrates the alternate laying of the bars where the upper surface 1 and the upper surface 2 are alternating depending on the assembly situation. Due to the alternate laying of the bars whose side surfaces 5 have the same slant, a plane upper surface 10 results which serves to delimit the reaction chamber and as the upper surface of an electrode. The slanted parts of the lateral surfaces 4 and the slant of the outermost lateral surfaces 5 (here shown as 5*a*) have the effect that the plane surface in the edge regions cannot be completely maintained. However, the portion of this edge region is less than 5% of the total surface and can therefore be neglected, such that the electrode surface can be called a plane surface 10. Apart from that it is also possible to connect further rows of bars, as shown in FIG. 3, with the result being an electrode 12 with a plane surface. In this case, depending on the arrangement, there can also be regions between the rows of all-round trapezoid bars which deviate from the plane surface. These regions are shown here as 4a. However, according to the invention, the total of all these regions is smaller than 5% of the total surface 10 of electrode 12.

The flow direction of a medium is indicated by reference number 14.

Such magnesium electrodes are used in particular to separate phosphate from phosphate-containing waste water where they serve as sacrificial electrodes in the reactor.

Figure 4:
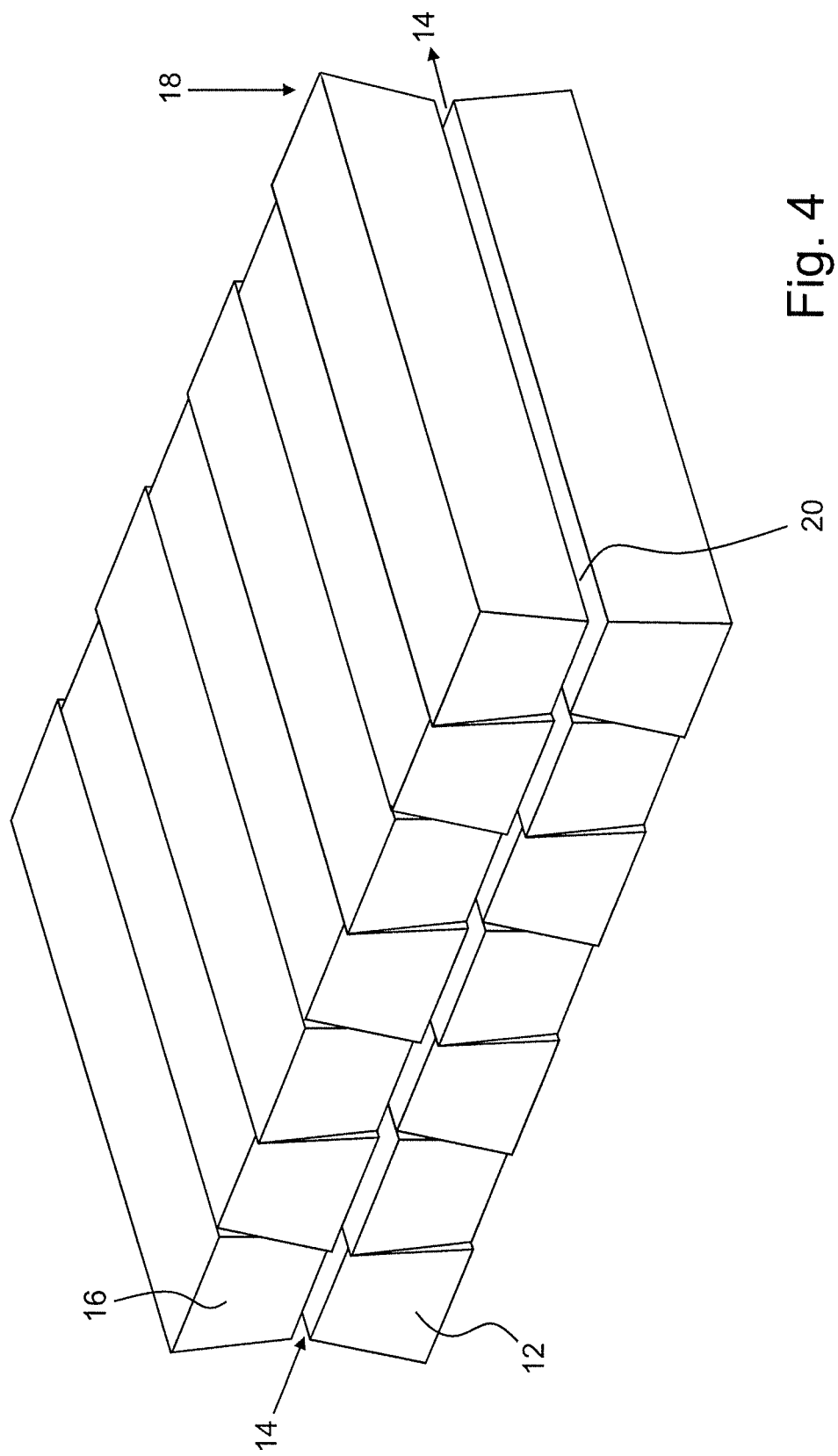
FIG. 4 shows an arrangement of the upper and lower electrode.

FIG. 4 shows the arrangement of two electrodes 12 and 16, whereby electrode 16, which is the upper electrode in the drawing, is movable in the direction of arrow 18 such that the reaction chamber 20 between the electrodes always remains of the same size and is thus able to provide flow rates and conversion rates as constant as possible. The polarity of electrodes 12, 16 is alternated at intervals to reduce deposits forming on electrodes 12, 16. Both electrodes 12, 16 serve as sacrificial electrodes as required, whereby deposits usually form on the cathode. After the polarity is changed, the deposits can be removed by the liquid stream. In this case, too, the flow direction is indicated by reference number 14.

FIG. 5 shows a top view of the lower electrode 12 where the upper surfaces 1 and 2, but also the lateral surfaces 4 and 5 can be seen. The tapered lateral regions ought to be no more than 2% of the plane electrode surface.

FIG. 6 shows the upper electrode 16 in a cut-out view which indicates that due to differences in casting, the upper surfaces 1 and 2 on the side opposite surface 10 can have different height levels when surface 10 is plane, such that it is difficult to establish contact via a plate. Therefore, it is preferable according to the invention to make contact for alternating the polarity via a flexible contact strip 22, for example in the form of a link chain, such that every single bar comes in contact with contact strip 22.

In this manner, the secure contacting of all bars can be achieved.

Figure 7A:
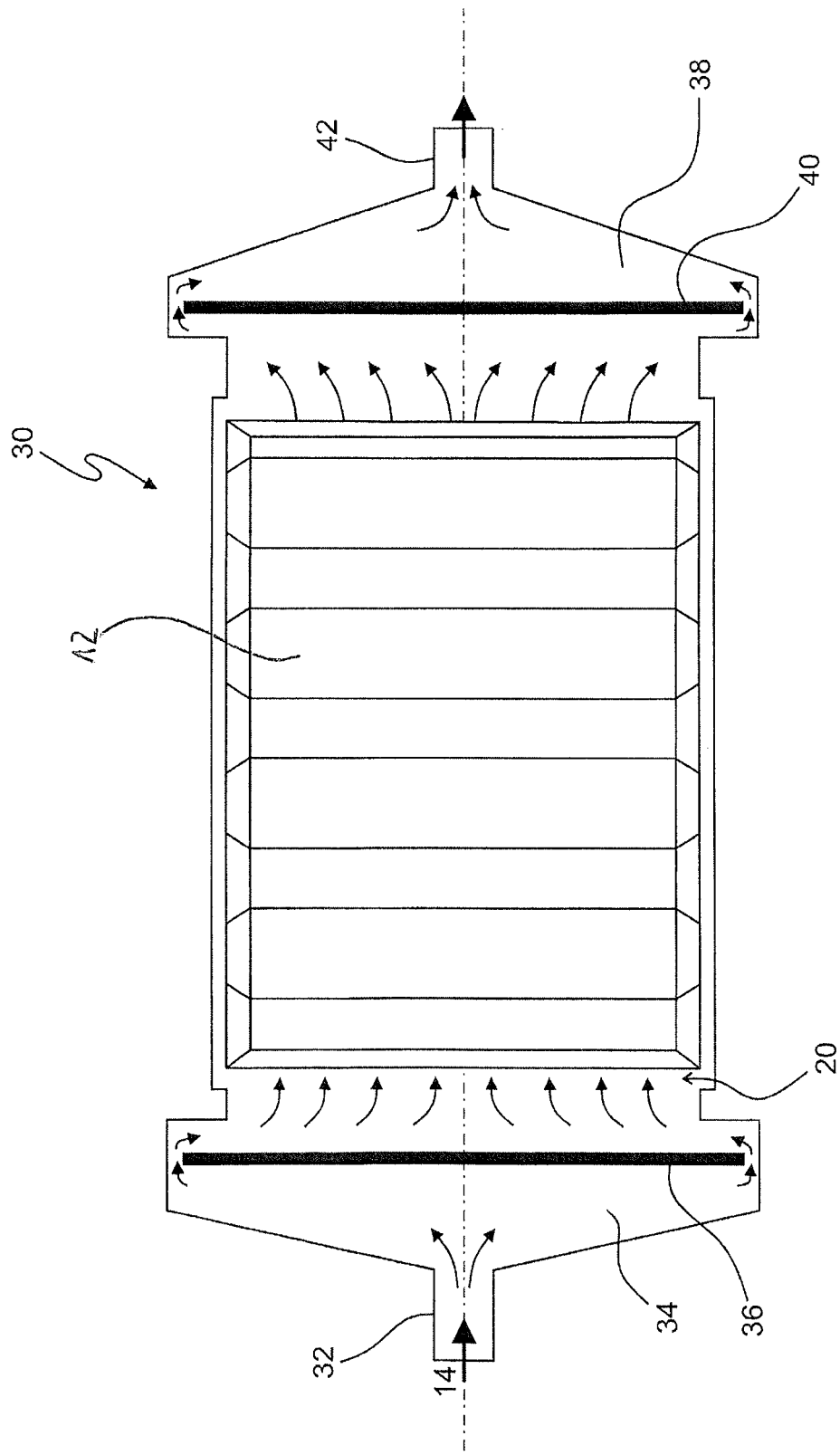
FIG. 7 shows two views of inventive reactors.

In views (a) and (b), FIG. 7 shows inventive reactors 30, whereby FIG. 7a shows a section through a reactor 20 with a view of electrode 12 according to FIG. 5. Here, the liquid flows via inlet 32 into a pre-chamber 34 and around a bulkhead 36 provided such that the whole stream is directed around bulkhead 36 which serves to equalize the flow. Then the liquid enters reaction chamber 20 between the electrodes 12 and 16. In reaction room 20, the electrodes 12 and 16 are provided in the form of bars laid in alternation. After flowing through reaction chamber 20, the liquid flows through an after-chamber 38, and there again around a bulkhead 40 and through an outlet 42.

FIG. 7b shows a reactor 30' in another sectional plane, without any pre-chamber or after-chamber. Electrodes 12 and 16 constructed of the bars are accommodated in housing 44 which comprises an upper part 48 and a base 46.

What is claimed is:

1. Electrolytic reactor for separating phosphate from phosphate-containing liquids and recovering phosphate salts, comprising a housing, an inlet and an outlet for the liquid, and first and second sacrificial magnesium anodes which enclose a reactor chamber between them where the liquid may flow in a direction, characterized in that each of the anodes are constructed of trapezoid bars which have a first upper surface and a second upper surface, whereby the first upper surface is smaller than the second upper surface, and four lateral surfaces which each connect the first with the second upper surface, characterized in that the trapezoid bars for building a continuous surface are alternately arranged with the first and second upper surface facing the reaction chamber and complement each other in form.

2. Reactor according to claim 1, characterized in that the trapezoid bars have a longitudinal direction and in terms of their longitudinal direction are arranged transverse to the flow direction of the reactor chamber.

3. Reactor according to claim 1, characterized in that the reaction chamber has a rectangular cross-section in the flow direction and a constant cross-section dimension throughout the entire reaction chamber.

4. Reactor according to claim 1, characterized in that one anode is movable relative to the other anode such that the spacing between the two anodes is constant.

5. Reactor according to claim 1, characterized in that the trapezoid bars of the anodes form a rectangular surface facing the reactor chamber.

6. Reactor according to claim 1, characterized in that the anodes can be alternated to act as anode and as cathode.

7. Reactor according to claim 4, characterized in that the movable anode is contacted via a flexible contact strip or a flexible contact chain that is in contact with every one of the trapezoid bars.

* * * * *